United States Patent [19]

Hoff

[11] 4,297,829

[45] Nov. 3, 1981

[54] LAWN MOWER BLADE ROTATION WARNING DEVICE

[75] Inventor: Stephen J. Hoff, Richmond, Ind.

[73] Assignee: Hoffco, Inc., Richmond, Ind.

[21] Appl. No.: 195,745

[22] Filed: Oct. 10, 1980

Related U.S. Application Data

[63] Continuation-in-part of Ser. No. 114,956, Jan. 24, 1980, Pat. No. 4,152,881.

[51] Int. Cl.³ .............................................. A01D 75/20
[52] U.S. Cl. .................................... 56/11.3; 192/30 W
[58] Field of Search ............. 56/11.3, 295; 192/30 W

[56] References Cited

U.S. PATENT DOCUMENTS

| | | | |
|---|---|---|---|
| 2,647,600 | 8/1953 | Anderson | 190/30 W |
| 2,978,858 | 4/1961 | Moody | 56/295 |
| 3,756,042 | 9/1973 | Heth et al. | 192/30 W |
| 4,152,881 | 5/1979 | Hoff | 56/11.3 |

*Primary Examiner*—Paul J. Hirsch

*Attorney, Agent, or Firm*—Jenkins, Coffey, Hyland, Badger & Conard

[57] ABSTRACT

A warning device for a lawn mower having a rotary blade driven from a motor through a centrifugal clutch and normally held stopped by a brake which is released by a deadman control. The warning device comprises a flexible clicker post such as a close-wound helical spring carried by the clutch driver and having a weighted clicker head at its free end which normally stands in the path of a blade-mounting nut or other striker on the clutch-driven part so that the clicker head on the post will be repeatedly struck by the nut or other striker in the event the clutch driver element is stopped while the brake is disengaged and allows the blade to rotate under its own momentum. When the clutch driver is rotating at normal driving speed, centrifugal force bends the flexible arm to carry the clicker head out of striking relation with the striker element on the driven clutch part.

10 Claims, 5 Drawing Figures

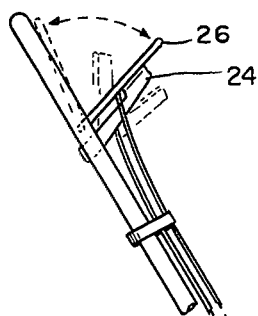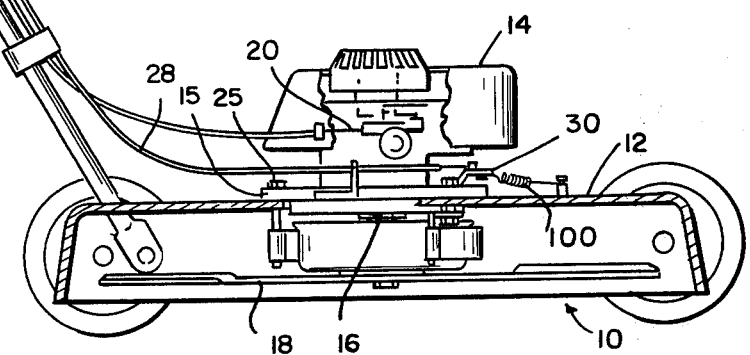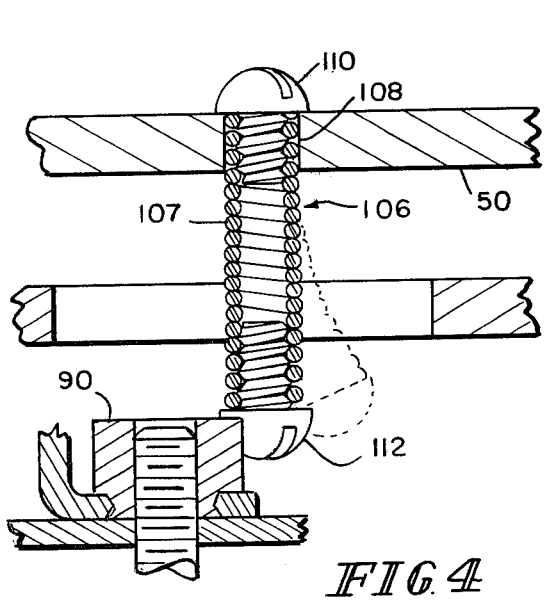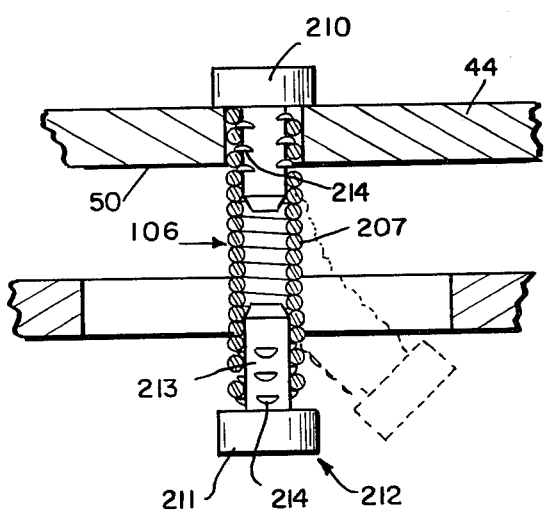

LAWN MOWER BLADE ROTATION WARNING DEVICE

This is a continuation-in-part of my co-pending application Ser. No. 114,956, filed Jan. 24, 1980, now U.S. Pat. No. 4,152,881.

In such co-pending application and in my prior U.S. Pat. No. 4,152,881, I provide a warning device which operates to generate an audible warning signal in the event the blade-driving engine of a rotary lawn mower is stopped under conditions such that the blade rotates under its own momentum without the accompanying noise from the engine to indicate that such rotation is occurring. In my prior patent and co-pending application, a rotary lawn mower blade is connected to its driving engine through a centrifugal clutch having centrifugal shoes on the clutch driver which are normally retracted at and below engine-idling speeds and which at engine-operating speeds are centrifugally engaged with a driven clutch drum forming part of a rotary blade carrier. A blade brake, such as a band engaging the external surface of the clutch drum, normally holds the blade stopped under engine idling or stopped conditions. When the operator actuates a deadman control, this concurrently releases the brake and opens the engine throttle. The resulting higher engine speed actuates the centrifugal clutch so as to drive the drum and the blade. The primary purpose of this blade control arrangement is safety, so that the blade will not be driven except when the operator of the lawn mower is in a proper operating position and appropriately holds the deadman control handle in actuated position. An unsafe condition can occur with this arrangement when the engine stops, as from running out of fuel or because of some other failure, while the deadman control is held in its actuated position. Under these conditions, the centrifugal clutch disengages and the brake is also held disengaged by the actuated deadman lever, so that the blade and the driven clutch drum are free to rotate from the momentum of the blade, which has a high polar moment of inertia. Such rotation makes no noise, and since the engine is stopped and silent, the operator may assume that the blade is stopped when in fact it may be rotating at considerable speed and with considerable momentum. The purpose of the warning device is to give an audible warning that the blade is rotating so that the operator is warned against letting his foot or hand move into the path of the blade. In my prior U.S. Pat. No. 4,152,881, and in one modification shown in my co-pending application, the warning device comprises a pivoted clicker arm mounted in the plane of rotation of the clutch driver, and requires both a pivotal mounting and a separate biasing spring which are relatively expensive to provide and which take up extra space in the limited-space mechanism.

In accordance with the present invention, the warning device comprises a flexible clicker arm or post mounted on the clutch driver and having a head or other clicker portion at its free end which normally stands in the path of relative movement of a striker element which rotates with the blade, such as a blade-mounting nut on the clutch-driven element and blade carrier. Preferably, the clicker arm is a flexible post, such as a close-wound wire spring, fixed at one end to the clutch driver at an eccentric position thereon and preferably extending axially so as to normally hold its clicker head in the path of relative movement of the striker element where it will be repeatedly struck by the striker element and thereby generate an audible warning signal. When the clutch driver is rotating at normal speed, centrifugal force will cause the post to flex outward to carry its clicker head out of such path of relative movement of the striker element so that under normal operating conditions relative rotation of the clutch driver and driven parts will not generate a signal or cause wear on the signal elements.

The accompanying drawings illustrate the invention and show a preferred embodiment exemplifying the best mode of carrying out the invention as presently perceived. In such drawings:

FIG. 1 is a side elevation, with parts broken away, of a lawn mower representative of a type with which the present invention is used;

FIG. 4 is an enlarged partial section showing a clicker post and its mounting; and FIG. 5 is a similar enlarged partial section showing a modified clicker post with a different retainer and head.

Figure 2:
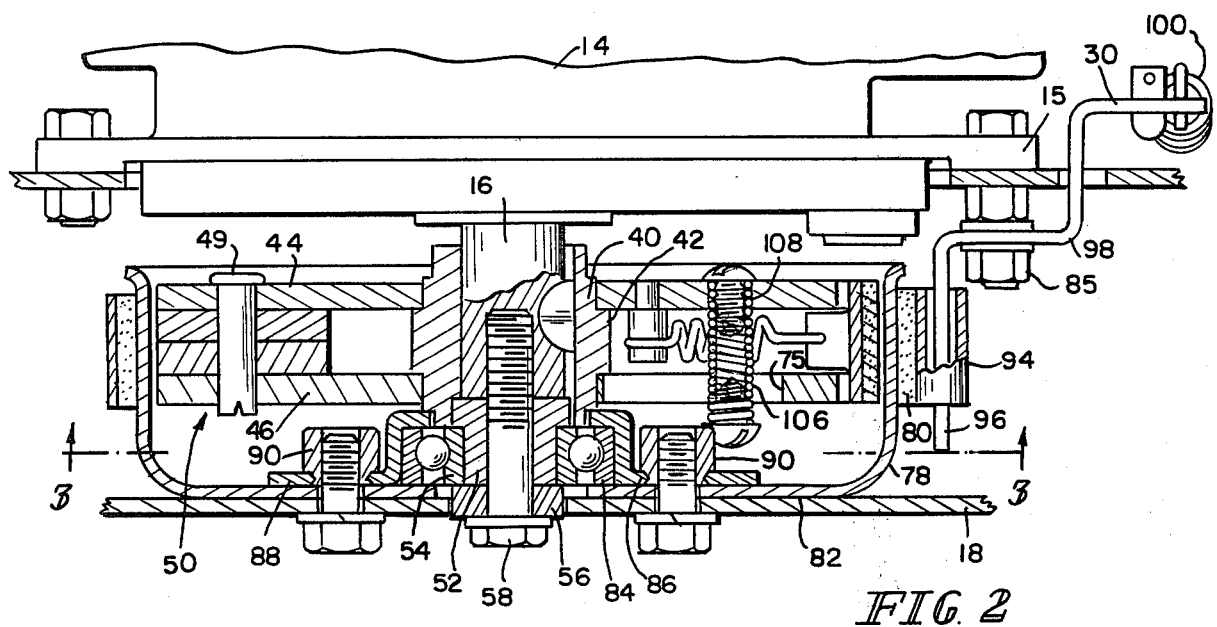
FIG. 2 is a vertical section showing a clutch and brake mechanism for driving and braking the blade, taken on the axis of the drive shaft, and including a warning device in accordance with the invention.

The lawn mower shown in FIG. 1 comprises a housing 10 mounted on suitable wheels and having a top deck 12 with a central opening on the rim of which an engine 14 is mounted by means of a mounting flange 15 and a series of bolts 25. The engine output shaft 16 extends downward below the deck and is there connected to supporting and driving mechanism for a rotary blade 18, as will be more fully explained below. The engine has a carburetor control arm connected to a bowden wire 20 and providing a range of run positions and a stop position which closes a grounding switch for grounding the ignition of the engine and thus stopping the engine. The mower has a handle 22 which carries a throttle lever 26 connected to operate the bowden wire 20 for controlling the engine. The handle also has a deadman lever 26 connected by a cable 28 to control a brake lever 30 to operate a blade brake.

The blade-supporting and -driving mechanism shown in FIG. 2 comprises a hub 40 mounted on and keyed to the engine shaft 16 and formed with opposite facing shoulders 42. A generally circular top plate 44 and a similar bottom plate 46 are mounted on the hub against such shoulders 42 and at their outer peripheries are held in spaced relation by three pairs of spacer lugs 48. The two plates 44 and 46 are riveted together against such spacer slugs by rivets 49 so that with the hub 40 they form a generally circular and unitary clutch driver rotor 50 which is keyed to the shaft 16 and rotates therewith. An extension 52 is press-fitted in the bottom end of the hub 40 and has a smaller diameter portion which receives the inner race 54 of a ball bearing set, and such race is secured to the hub by a washer 56 and a bolt 58 which is threaded into the end of the engine shaft 16.

The rotor 50 serves both to provide the primary flywheel effect for the engine 20 and also to form a centrifugal clutch driver. To provide such flywheel effect, the rotor is formed of heavy plates 44, 46 of relatively large diameter, for example, six-inch diameter. The spacer slugs form weights which add to the peripheral mass of the rotor 50 to increase its rotational or polar moment of inertia and its flywheel effect. For purposes of the function of the rotor 50 as a centrifugal clutch driver, the generally circular top and bottom plates are formed at three spaced points about their peripheries with shallow recesses 60 between the positions of the spacer slugs 48. Clutch shoes 62 are mounted in such recesses and, as shown in FIG. 2, have a clutch face portions of substantially the same width as the rotor 50 and are mounted by means of narrower tangs which enter between the plates 44 and 46. The tang 66 at the leading end of each shoe 62 is bent to form a pivot loop about a pivot pin 68 passing through the two plates. The tang 70 at the trailing end of each clutch shoe 62 is engaged by a biasing spring 72 which extends inward to an anchor post 74 fixed in an opening in the top plate 44. For access to the springs 72, the bottom plate 46 is provided with circular access openings 75.

The combined flywheel and clutch driver 50 is surrounded by a cylindrical drum 78 forming part of a blade carrier, and is adapted to be engaged on its inner surface by the cylindrical clutch shoes 62 and on its outer surface by a brake band 80. The cylindrical drum 78 has a bottom radial wall 82 extending inward into underlapping relation with the outer race 84 of the ball bearing set previously referred to, and such outer race 84 is retained between the inner edge of the drum flange 82 and the inturned flange at the top of a mounting ring 86 which has a wide base flange 88 lying against the drum flange 82. At diametrically opposite points, the base flange 88 carries a pair of rivet nuts 90 which have upstanding nut portions and have neck portions which extend through the flanges 88 and are clinched or riveted thereto. The flanges 82 and 88 are desirably riveted together at at least two points angularly spaced from the nuts 90.

The brake band 80 carries a liner over most of its length and is formed at its ends with mounting loops 94. The loop at one end is anchored to one mounting bolt 25, which is made long enough for this purpose. The opposite end loop 94 is engaged on the downturned finger 96 of the brake lever 98 which is pivotally mounted between a pair of nuts on the bottom end of a second motor mounting bolt 25. From such pivotal mounting, the lever extends outward and then upward through the deck 14 and then outward to form the brake-actuating arm 30 to which the brake control cable 28 is connected. The actuating arm is normally biased to brake-on position by a spring 100.

Figure 3:
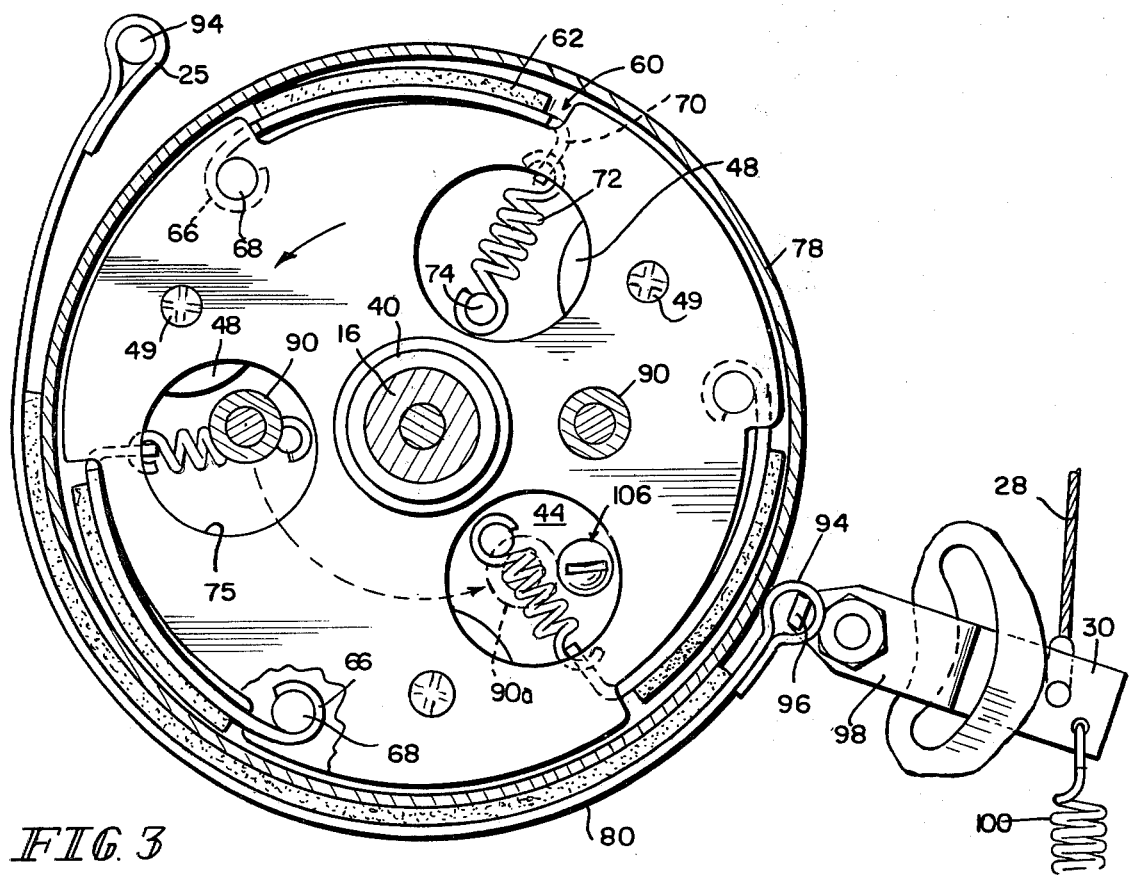
FIG. 3 is a section taken on the line 3—3 of FIG. 2.

In accordance with the present invention, the blade driving and support mechanism includes a simplified audible signal-making device. As shown in FIGS. 2–4, this comprises a clicker post 106 in the form of a helically-wound spring 107 which is mounted at its upper end in a hole 108 at an eccentric point in the top plate 44 of the rotor 50 and extends axially downward through one of the openings 75 in the bottom plate into the path of the rivet nuts 90 for the bolts which fasten the blade 18 to the driven rotor drum 78. Desirably, the post 106 is mounted by inserting a threaded screw 110 in the upper end of the spring and then pressing such end downward through the hole 108. The threaded screw 110 has a stem of a size to internally support the spring, and the hole 108 is made of a size to have a tight press fit about the internally supported upper end of the spring. As shown in FIG. 4, the threaded screw 110 may be a standard screw having thread grooves to fit the windings of the spring 107. The post 106 has a striking portion at its free bottom end, which may be constituted by the end of the spring, but preferably comprises a striker mass fixed to such end. Such mass both provides a clicker head and adds mass to increase the centrifugal response of the post. As shown in FIG. 4, such mass is provided by the head 112 of a threaded screw like the screw 110 which fits tightly within the turns at the lower end of the spring. As shown, the flexible clicker post 106 is so positioned on the clutch driver rotor that its head 112 normally lies in the path of the nuts 90 on the clutch-driven rotor so as to be struck thereby if the driven rotor is rotating while the driving rotor 50 is stopped, and thereby to generate an audible warning signal. This is indicated in FIG. 2. If the clutch driver rotor 50 is stopped and the blade rotating, the blade nut 90 at the left will move in the path indicated from its full line position to the dotted line position 90a where it will strike the clicker post 106. The spring post 106 is flexible over its length, so that it will yield to let the nut pass and so that when the rotor 50 is rotating at some predetermined speed, such post will flex outward to a position such as shown in dotted lines in FIG. 4 where its clicker head 112 will clear the path of the nuts 90 and no audible signal will be produced.

The modification of FIG. 5 is similar to that of FIG. 4, except that the retainer member 210 for the clicker post 106 is a specially formed insert for this purpose and not a threaded screw as shown in FIG. 4. Such insert has a head portion large enough to engage the top surface of the top plate 44 of the roller 50 and has a stem which may be in the form of a tapered pin and which is formed with a plurality of barbs 214 which engage between the turns of the spring 207. Similarly, the bottom insert 212 has a clicker head 211 forming a striker means, and has a stem 213 formed with a plurality of barbs 214 which interengage with the turns of the spring 207 to hold the clicker in place. The head portion 211 of the striker 212 is made of a suitable weight to provide an effective signal when struck by the nuts 90 and to bend the flexible spring post 106 to a clearance position shown in dotted lines under the influence of centrifugal force when the rotor 50 is rotating at a predetermined speed.

Operation is as follows. When the motor is at rest with the engine off and the deadman lever 26 in its inactive position as shown in full lines in FIG. 1, the carburetor control arm will be in its shorting position, and the brake lever will be pulled to a brake-on position by the spring 100 as shown in FIG. 3. The centrifugal clutch shoes 62 will be retracted as shown in FIG. 3 so that the clutch driving rotor 50 will be disengaged from the driven drum 78 which will be held stopped by the brake. By suitably moving the throttle, the engine can be started and will run at idle speed without actuating the clutch shoes to engage the clutch. Rotation is clockwise when viewed from above, and counterclockwise when viewed from below as in FIG. 2. The flexible clicker post 106 may be made of such flexibility that it will flex outward to its dotted-line position as shown in FIG. 4 during such idle operation of the engine, but whether or not it is so made is not critical, since at idling speeds the engine will not drive the blade and will be making sufficient noise to signal the operator that operation is occurring. To operate the mower, the operator raises the deadman lever 26 to actuated position, shown in dotted lines in FIG. 1. This pulls the cable 28 so as to disengage the brake 80 from the drum 78. The operator also moves the throttle lever 24 to run position so as to increase engine speed. As the engine accelerates, the clutch shoes 62 will move outward under centrifugal force to engage the drum 78 and drive that drum and the connected blade 18. During initial clutch engagement, there may be some relative rotation of the clutch drive rotor 50 relative to the driven drum 78, with the drive rotor overrunning the drum, and hence relative rotation between the flexible clicker post 106 and the blade nuts 90. However, at clutch-engaging speeds of rotation of the clutch driver 50, the flexible clicker post 106 will be swung outward to a nut-clearing position, and no warning signal will be generated.

If the operator releases the deadman lever, the spring 100 will automatically pull it to its inactive position as shown in full lines in FIG. 1, and will move the brake lever 98 to its brake-on position to promptly apply the brake. The throttle lever 24 will be simultaneously moved to idle position, and the reduced speed of the clutch driver 50 which then results both from reduced throttle setting and concurrent brake application will cause the clutch shoes 62 to be retracted and disengage the clutch. This will normally not result in allowing the flexible striker post 106 to swing back to a nut-striking and signal-generating position, but whether or not it does so will not be important since the engine will still be operating to make the operator aware that the mower is still in operation.

However, in the event the engine runs out of fuel or otherwise fails so that its shaft 16 stops while the deadman lever 26 is held in actuated position, the centrifugal clutch shoes 62 will be retracted by their biasing springs and disengaged from the drum 78, yet the brake 80 will also be held disengaged by the position of the deadman lever 26. Under these circumstances, the clutch drum 78 and blade carrier and the blade 18 will be free to rotate under their own momentum and may rotate at high speed with considerable energy, for a considerable length of time. Under these conditions, with the clutch driver 50 at rest, there will be no centrifugal force on the flexible clicker post 106 or its clicker head 112 or 212 to bend that post out of its normal position, and its striker head will stand in the path of rotation of the blade nuts 90. Such nuts will then strike the head of the post and produce a distinctly audible clicking sound synchronized with the rotation of the blade 18, and this will serve as a warning to the operator that the blade is still rotating. The frequency of the warning clicks will progressively decrease to indicate to the operator that the blade is slowing down, and will eventually cease and thereby indicate that the blade has stopped.

What is claimed is:

1. In a lawn mower having a rotary blade which is normally either driven by a motor through a releasable clutch having a driver connected to the motor or braked by a releasable brake, means for generating a warning signal in the event the clutch and brake are both sufficiently disengaged to permit the blade to rotate under its own momentum, said means comprising a striker carried with the driven blade, and a resiliently bendable clicker arm fixedly mounted at one end to said clutch driver and having a striking portion at its free end normally held by such arm in an operative position in the path of said striker so as to be struck thereby to generate an audible signal, said arm being resiliently bendable in response to centrifugal force so as to move said striking portion to an inactive position out of the path of the striker when the clutch driver is rotated above a predetermined speed.

2. Apparatus as in claim 1 in which said arm is an axially extending arm fixed to said clutch driver in an eccentric position and has a striker mass at its free end.

3. Apparatus as in claim 2 which includes a blade carrier mounted for rotation coaxially with the clutch driver, and in which said striker is a blade-mounting element on said carrier.

4. Apparatus as in claims 1 or 3 in which said resiliently bendable arm is a helically wound spring.

5. Apparatus as in claim 2 in which said resiliently bendable arm is a helically wound spring, and said striker mass comprises a head fixed to the end of the spring.

6. Apparatus as in claim 5 in which the head is carried by a stem inserted within said spring and interengaged with the end turns thereof.

7. Apparatus as in claim 1 in which said arm is a helically wound spring mounted by one end in a hole in the clutch driver, said end containing a stem received within its end coils and having a press fit between the internal stem and the surrounding wall of the mounting hole.

8. Apparatus as in claim 7 in which the arm is mounted in an eccentric position on a radial wall of the clutch driver and said mounting hole extends through such wall, and said stem has protrusions thereon interengaged with the turns of the spring within the press-fitted portion and has a head thereon overlying the edges of said hole to fix the spring in place.

9. In a lawn mower having a rotary blade which is normally either driven by a motor through a releasable clutch having a clutch driver element connected to the motor, or is braked by a releasable brake, means forming a clutch-driven element and blade carrier, means for generating a warning signal in the event the clutch and brake are both sufficiently disengaged to permit the blade to rotate under its own momentum, said means comprising a striker carried by one of said clutch driver and driven elements, a helically wound spring forming a clicker post fixedly mounted in the other of said clutch driver and driven elements and having a clicker head at its free end in position to strike said striker during relative rotation of the clutch driver and driven elements.

10. Apparatus as in claim 9 in which the clicker post is on the clutch driver element and is resiliently bent by centrifugal force to a position to stand clear of said striker when the clutch driver is rotating above a predetermined speed.

* * * * *

UNITED STATES PATENT AND TRADEMARK OFFICE
CERTIFICATE OF CORRECTION

PATENT NO. : 4,297,829
DATED : November 3, 1981
INVENTOR(S) : Stephen J. Hoff

It is certified that error appears in the above-identified patent and that said Letters Patent are hereby corrected as shown below:

In the heading, Item [63], change "4,152,881" to --4,316,355--.

Column 1, fifth line (third line of first paragraph), change "4,152,881" to --4,316,355--.

Signed and Sealed this

Twenty-seventh Day of April 1982

[SEAL]

Attest:

GERALD J. MOSSINGHOFF

Attesting Officer — Commissioner of Patents and Trademarks